(12) United States Patent
Wang et al.

(10) Patent No.: US 10,686,393 B2
(45) Date of Patent: Jun. 16, 2020

(54) METHOD FOR CORRECTING COMPENSATION ITEM OF PERMANENT MAGNET SYNCHRONOUS MOTOR (PMSM)

(71) Applicant: ZHONGSHAN BROAD-OCEAN MOTOR CO., LTD., Zhongshan (CN)

(72) Inventors: Jizhong Wang, Zhongshan (CN); Justin W. Kaput, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 45 days.

(21) Appl. No.: 16/141,956

(22) Filed: Sep. 25, 2018

(65) Prior Publication Data

US 2019/0245467 A1    Aug. 8, 2019

Related U.S. Application Data

(63) Continuation-in-part of application No. PCT/CN2018/075544, filed on Feb. 7, 2018.

(30) Foreign Application Priority Data

Feb. 5, 2018    (CN) .......................... 2018 1 0112181

(51) Int. Cl.
  *H02P 21/18*    (2016.01)
  *H02P 21/24*    (2016.01)
  *H02P 21/22*    (2016.01)
  *H02P 21/00*    (2016.01)
  *H02P 27/06*    (2006.01)

(52) U.S. Cl.
  CPC .......... *H02P 21/22* (2016.02); *H02P 21/0003* (2013.01); *H02P 27/06* (2013.01)

(58) Field of Classification Search
  CPC ........... H02P 23/04; H02P 6/15; H01L 31/107
  See application file for complete search history.

(56) References Cited

U.S. PATENT DOCUMENTS

2015/0185095 A1 *    7/2015    Wu .......................... G01L 3/26
                                                            73/862.08

* cited by examiner

*Primary Examiner* — Jorge L Carrasquillo
*Assistant Examiner* — Charles S Laughlin
(74) *Attorney, Agent, or Firm* — Matthias Scholl P.C.; Matthias Scholl

(57) ABSTRACT

A method for correcting a compensation item of a PMSM motor, the method including: offline measuring an error data of a parameter of a PMSM motor in a control process; providing a series of current commands and calculating compensation values of the parameter corresponding to the series of current commands; establishing a lookup table with regard to the series of current commands and the compensation values of the parameter corresponding to the series of current commands; storing the lookup table in a memory of a motor controller; starting and allowing the motor to work at a normal state; and online correcting the error data of the parameter by using the lookup table.

11 Claims, 12 Drawing Sheets

METHOD FOR CORRECTING COMPENSATION ITEM OF PERMANENT MAGNET SYNCHRONOUS MOTOR (PMSM)

CROSS-REFERENCE TO RELATED APPLICATIONS

This application is a continuation-in-part of International Patent Application No. PCT/CN2018/075544 with an international filing date of Feb. 7, 2018, designating the United States, now pending, and further claims foreign priority benefits to Chinese Patent Application No. 201810112181.5 filed Feb. 5, 2018. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to a method for correcting a compensation item of a permanent magnet synchronous motor (PMSM).

The air blowers are driven by a PMSM motor, and the rotation speed of the motor is controlled by a motor controller.

When the motor controller is working, to avoid the simultaneous turn-on/off of the switching transistors of the upper and lower half bridges of a frequency inverter, it is necessary to set a deadzone time; however, this inevitably leads to an error (in industry, it is called a deadzone error) between a given command voltage and an output voltage; therefore, during operation, the motor controller requires an appropriate compensation to correct the error.

In addition, in production, the operating parameters of the motor tend to fluctuate; if the fluctuation deviations are not corrected, the control accuracy of the motor controller will decrease, adversely affecting the performance of the motor.

So far, a common method for determining the compensation value for correcting the error is to use a reference model to calculate the compensation value prior to mass production. However, the method is a theoretical one-time correcting method, and cannot compensate errors in the operation processes.

Another method for determining the compensation value for correcting the error is to use additional pins on a Microprogram Control Unit (MCU) to real-time calculate a no-load time. This method requires at least 3 additional MCU pins. However, the method introduces extra hardware, which increases new potential fault point, reducing the reliability of the entire system.

SUMMARY

Disclosed is a method for correcting a compensation item of a PMSM motor that can efficiently compensate an error of the motor parameters in the operation processes, thus improving control precision of the motor and reducing the operation cost.

Disclosed is a method for correcting a compensation item of a PMSM motor, the method comprising: offline measuring an error data of a parameter of a PMSM motor in the control process, providing a series of current commands and calculating compensation values of the parameter corresponding to the series of current commands, establishing a lookup table with regard to the series of current commands and the compensation values of the parameter corresponding to the series of current commands, storing the lookup table in a memory of a motor controller, starting and allowing the motor to work at a normal state, online correcting the error data of the parameter by using the lookup table, to adapt to the current working condition of the motor, thus achieving the purpose of precise control.

The parameter of the PMSM motor refers to a deadzone error of a frequency inverter, and the lookup table refers to a relationship between the series of current commands and deadzone compensation values.

The lookup table with regard to the series of current commands and deadzone compensation values is established by the following steps:

1) controlling the frequency inverter to power on one phase of coil windings of the motor, and power off the remaining phases of coil windings, stepwise increasing the current of the one phase of coil windings from 0 to a rated current; and 2) recording and measuring a command voltage and a current generated by the command voltage when stepwise increasing the current, comparing the command voltage with a product of a stator resistance and the current generated by the command voltage, thus obtaining a voltage error, dividing the voltage error by a DC bus voltage, to obtain a deadzone compensation value corresponding to the current generated by the command voltage, and combining currents generated by different command voltages with corresponding deadzone compensation values, to form the lookup table involving the deadzone compensation values.

In the online running state of the motor, online correcting the error data of the parameter by using the lookup table is completed through an electromagnetic calculation equation:

$\lambda = f(U, I, R, L, Edt, Vdt, \lambda m)$, where $\lambda$ is the magnetic flux of the motor;

The function $f(U, I, R, L, Edt, Vdt, \lambda m)$ contains multiple variables, U is a voltage variable, which can be online measured; I is a current variable, which can be online measured; R is the stator resistance, which is offline measured; L is stator inductance, which is offline measured; Edt is an online correction compensation value; Vdt is a variable for the deadzone error of the frequency inverter; $\lambda m$ is the magnetic flux linkage of the motor, which is offline measured.

The above electromagnetic calculation equation $\lambda = f(U, I, R, L, Edt, Vdt, \lambda m)$ is established under sensorless vector control, and is represented by:

$$\lambda_{s\alpha}^{n} = \Sigma V_{s\alpha}^{*n} + g(\lambda_m - \lambda_{s\alpha}^{n-1}) - R_s I_{s\alpha}^{n} - E_{dt}^{n-1} V_{dt\alpha}^{n}$$

where, $\lambda_{s\alpha}^{n}$ is the $\alpha$-axis magnetic flux vector at the $n^{th}$ step; $\lambda m$ is the magnetic flux linkage of the motor;

$V_{s\alpha}^{*n}$ is the $\alpha$-axis voltage vector at the $n^{th}$ step; $g = Rs/Ld$, Rs is the stator resistance, and Ld is the d-axis inductance;

$\lambda_{s\alpha}^{n-1}$ is the $\alpha$-axis magnetic flux vector at the $n-1^{th}$ step; $I_{s\alpha}^{n}$ is the $\alpha$-axis current vector at the $n^{th}$ step;

$E_{dt}^{n-1}$ is the compensation value at the $n-1^{th}$ step; $V_{dt\alpha}^{n}$ is the variable for the $\alpha$-axis deadzone error at the $n^{th}$ step;

n is the number of adjustment of $E_{dt}^{n-1}$.

A method for correcting a compensation item of a PMSM motor, the method comprises: storing offline measured stator resistance value Rs, inductance L, magnetic flux linkage $\lambda m$ and a deadzone-compensation lookup table in a memory of a motor controller, where the deadzone-compensation lookup table is a comparison table formed by combining the currents generated by different command voltages and the corresponding deadzone compensation values; allowing the motor to run, ordering, by the motor controller, a command voltage U, then detecting a measured current I generated by the voltage command U, and finding out a corresponding compensation value Vdt according to the measured current I in the deadzone-compensation lookup table, establishing an equation for calculating the magnetic flux: λ=f (U, I, R, L, Edt, Vdt, λm) using the electromagnetic theory for a motor, where, λ is the magnetic flux of the motor; the function f (U, I, R, L, Edt, Vdt, λm) contains multiple variables, U is a voltage variable, which can be online measured; I is a current variable, which can be online measured; R is the stator resistance, which is offline measured; L is the stator inductance, which is offline measured; Edt is an online correction compensation value; Vdt is a variable for the deadzone error of the frequency inverter; λm is the magnetic flux linkage of the motor, which is offline measured; using the equation λ=f (U, I, R, L, Edt, Vdt, λm) to perform online correction on the compensation value Edt.

The lookup table with regard to the deadzone compensation values is established by the following steps: controlling the frequency inverter to power on one phase of coil windings of the motor, and power off the remaining phases of coil windings, stepwise increasing the current of the one phase of coil windings from 0 to a rated current; and recording and measuring a command voltage and a current generated by the command voltage when increasing the current, comparing the command voltage with a product of a stator resistance and the current generated by the command voltage, thus obtaining a voltage error, dividing the voltage error by a DC bus voltage, to obtain a deadzone compensation value corresponding to the current generated by the command voltage, and combining currents generated by different command voltages with corresponding deadzone compensation values, to form the lookup table involving the deadzone compensation values.

The above magnetic flux calculation equation λ=f (U, I, R, L, Edt, Vdt, λm) is obtained based on an electromagnetic theoretical model of a BLDC motor under vector control in the absence of a position sensor.

The above assumes that the dq coordinate system coincides with the αβ coordinate system, θ=0°, at the time that the motor is started but the motor has not rotated, the speed is 0, and an equation established under a sensorless vector control is as follows:

$$\lambda_{s\alpha}^n = \Sigma V_{s\alpha}^{*n} + g(\lambda_m - \lambda_{s\alpha}^{n-1}) - R_s I_{s\alpha}^n - E_{dt}^{n-1} V_{dt\alpha}^n$$

where, $\lambda_{s\alpha}^n$ is the α-axis magnetic flux vector at the $n^{th}$ step; λm is the magnetic flux linkage of the motor;
$V_{s\alpha}^{*n}$ is the α-axis voltage vector at the $n^{th}$ step; g=Rs/Ld, Rs is the stator resistance, and Ld is the d-axis inductance;
$\lambda_{s\alpha}^{n-1}$ is the α-axis magnetic flux vector at the $n-1^{th}$ step;
$I_{s\alpha}^n$ is the α-axis current vector at the $n^{th}$ step;
$E_{dt}^{n-1}$ is the compensation value at the $n-1^{th}$ step; $V_{dt\alpha}^n$ is the variable for the α-axis deadzone error at the $n^{th}$ step.

The compensation value is corrected as follows: inputting a constant command voltage $V_{s\alpha}^{*n}$, letting a dq coordinate system coincide with an αβ coordinate system, θ=0°, and giving an initial value of the compensation value Edt, thus according to the difference between a calculated magnetic flux $\lambda_{s\alpha}^n$ and the magnetic flux linkage λm, continuously narrowing the difference to online correct the compensation value Edt, until the calculated flux $\lambda_{s\alpha}^n$ equals to the magnetic flux linkage λm.

The step 2 described above is executed every time the motor is started or at time intervals, to acquire a current online correction compensation value Edt.

Advantages of the method for correcting a compensation item of a PMSM motor are summarized as follows:

1) Offline measurement can reduce computation time of a microprocessor (single-chip microcomputer or MCU) in the motor controller; during an online running state, the compensation item is again corrected by using the lookup table of the compensation item of the above-mentioned certain parameter, and at the same time, the errors of the motor parameters due to operation processes are compensated, thus improving control precision of the motor, and offering strong adaptability.

2) Offline measurement of a certain parameter of the motor refers to the deadzone error of the frequency inverter; the obtained lookup table is a look-up table involving both current commands and deadzone compensation, and can be applied to different frequency inverters, and thus, one only needs to test the lookup table involving both current command and deadzone compensation for a certain type of frequency inverter, and therefore it is very convenient for production and does not require rewriting programs.

3) The compensation value is an overall correction to the set of variables, and the algorithm is simple, easy to implement, and reliable.

4) The compensation value is calculated every time the motor is started or at time intervals, to ensure precision and reliability of the motor control.

5) The equation for calculating the magnetic flux is relatively simple, with less computational amount and less high requirements for a CPU, which is beneficial to reduce the hardware cost.

DETAILED DESCRIPTION

Figure 1:
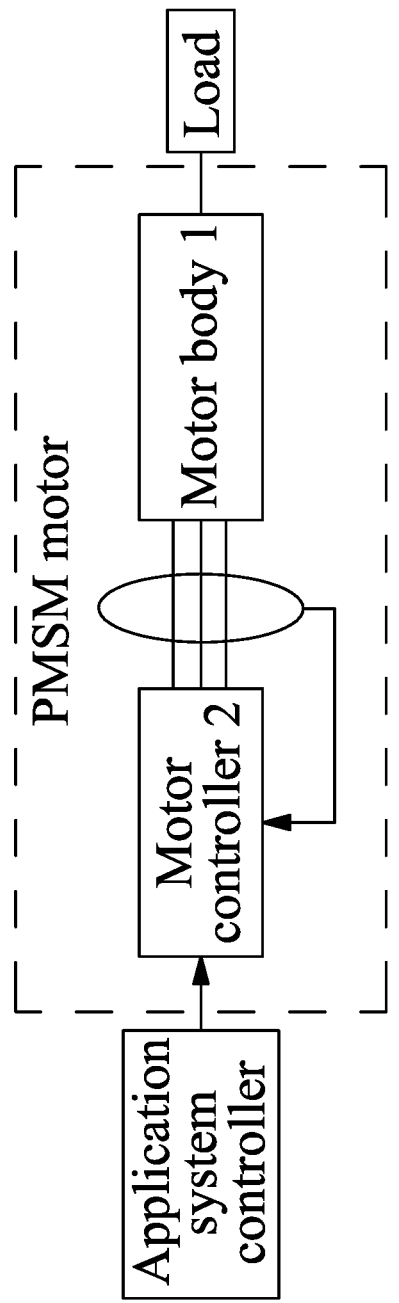
FIG. 1 is a schematic view showing an application of a PMSM motor according to a first embodiment of the disclosure.
Figure 2:
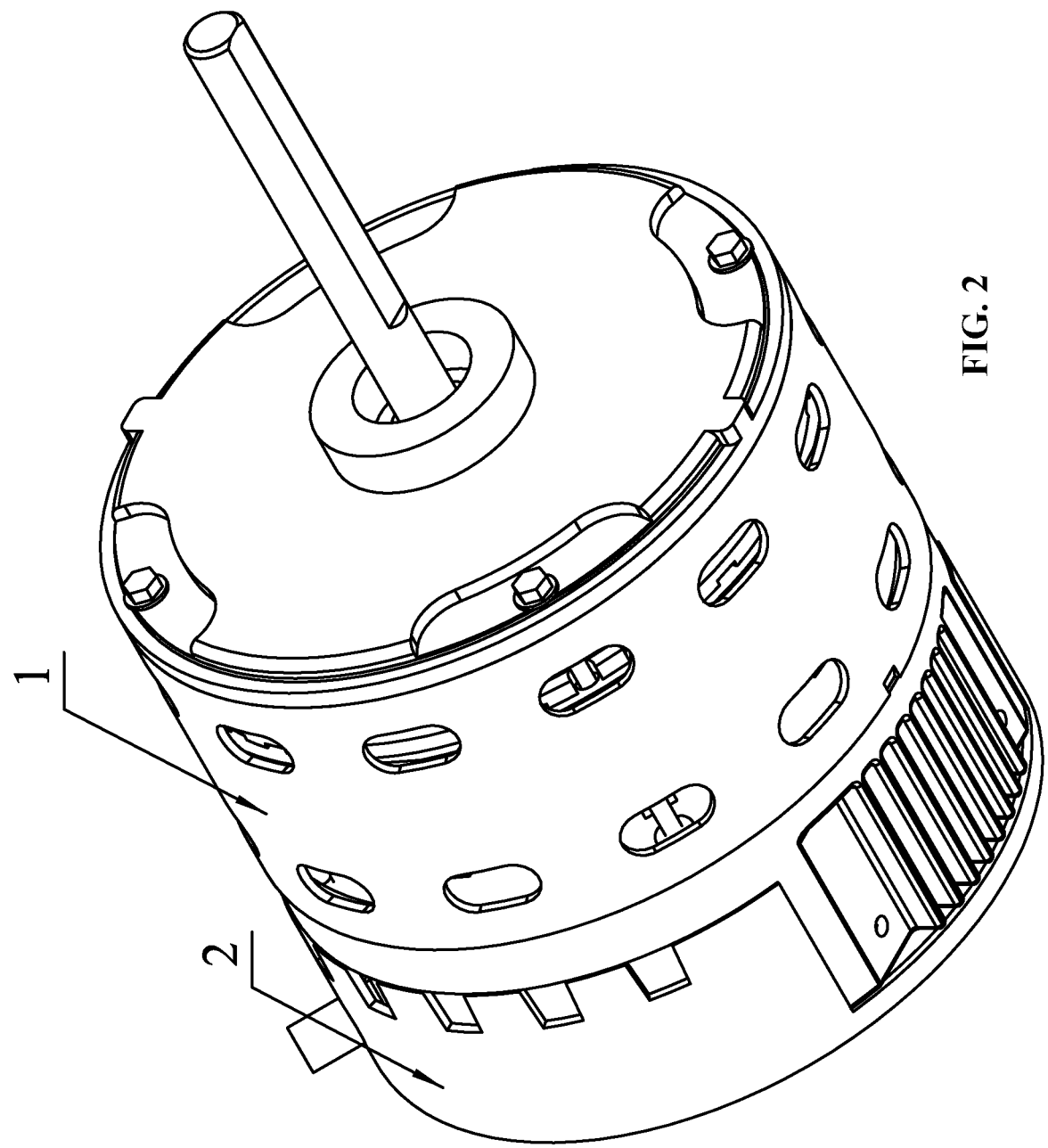
FIG. 2 is a perspective view of the PMSM motor according to the first embodiment of the disclosure.
Figure 3:
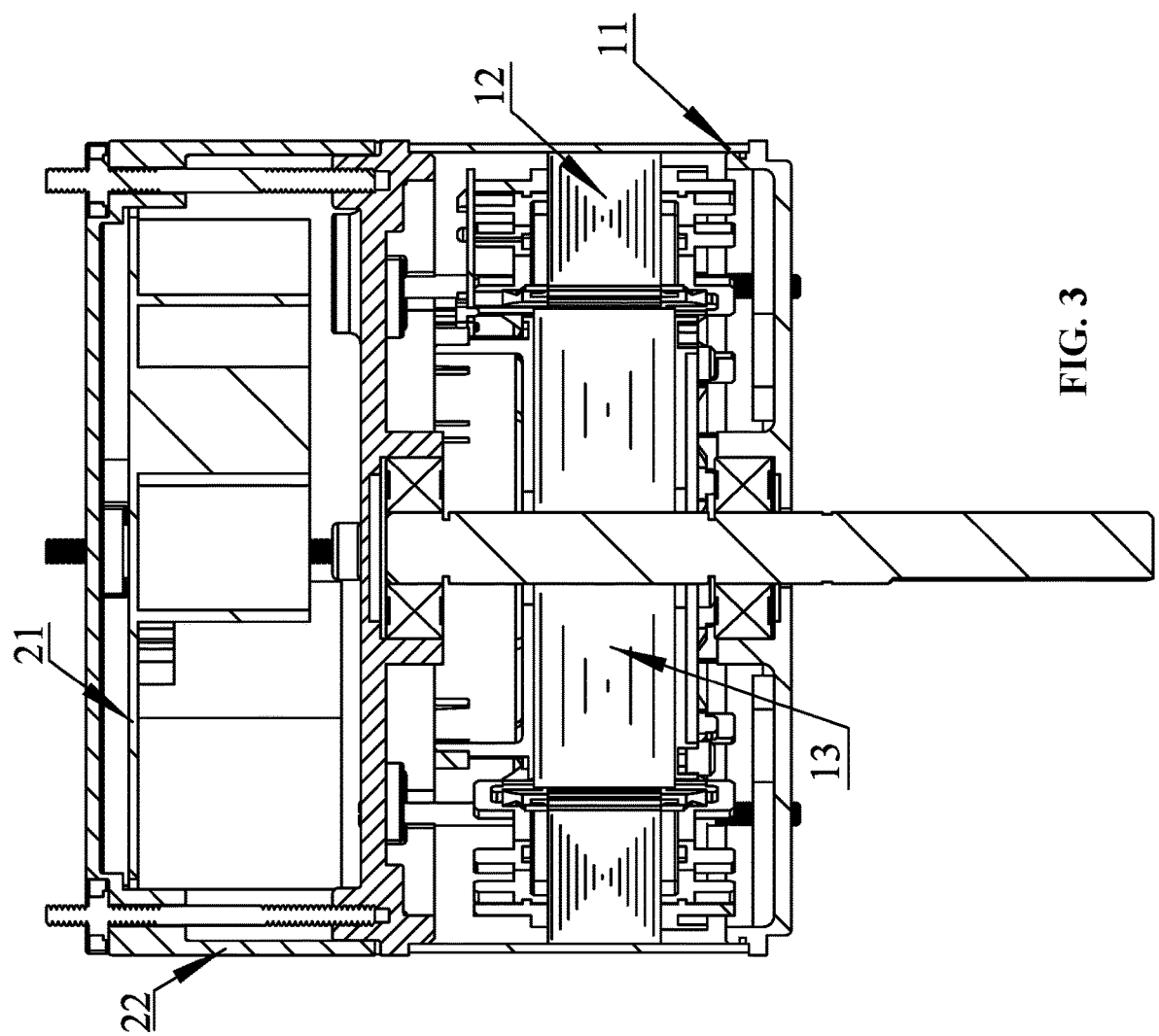
FIG. 3 is a cross-sectional view showing the structure of the PMSM motor according to the first embodiment of the disclosure.
Figure 4:
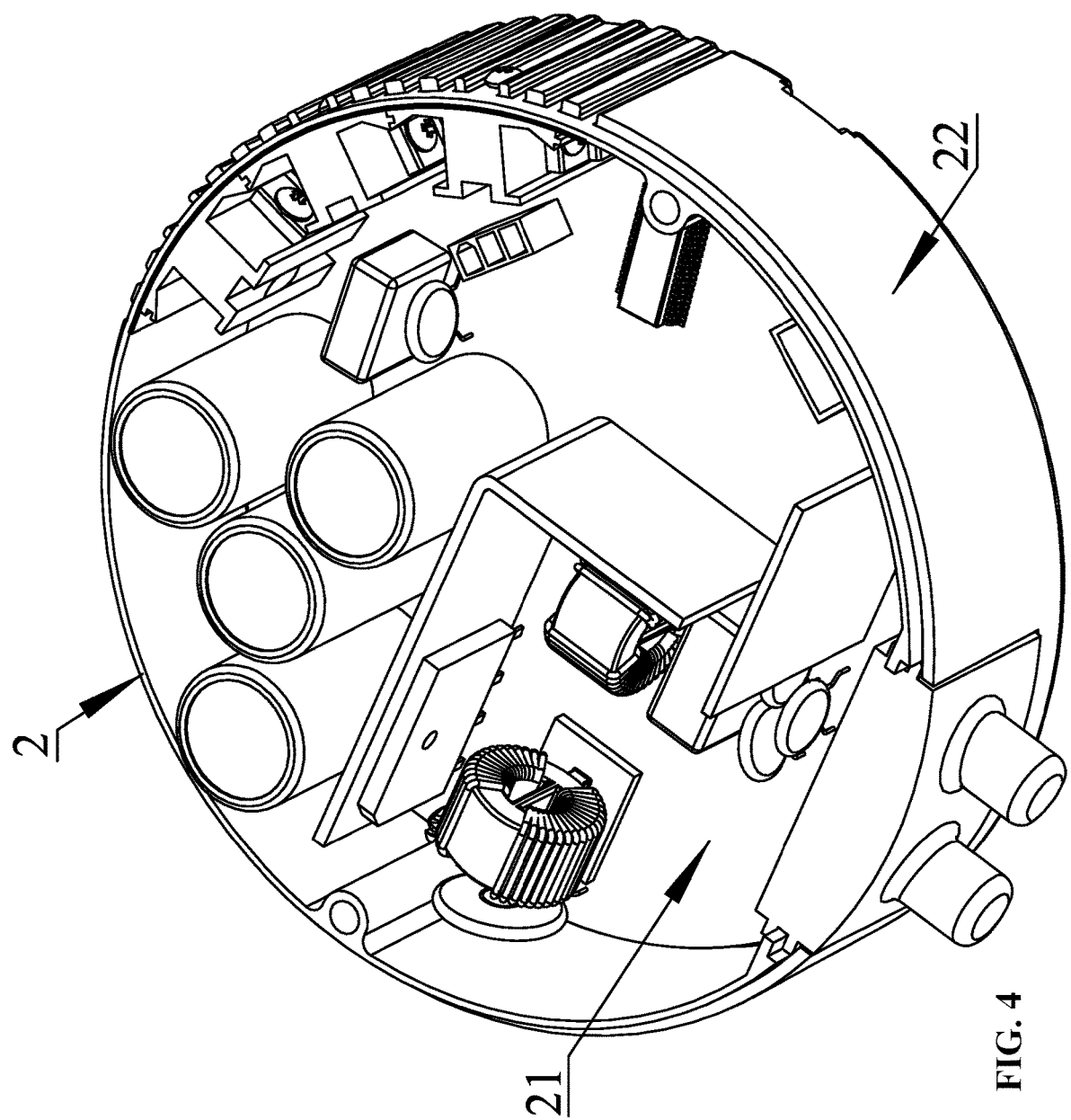
FIG. 4 is a perspective view of a motor controller of the PMSM motor according to the first embodiment of the disclosure.

For further illustrating, experiments detailing a method for correcting a compensation item of a permanent magnet synchronous motor (PMSM) are described below. It should be noted that the following examples are intended to describe and not to limit the disclosure.

Example 1

As shown in FIG. 1, FIG. 2, FIG. 3, FIG. 4 and FIG. 5, the PMSM motor mentioned in the disclosure comprises a motor controller 2 and a motor body 1; the motor body 1 comprises a stator assembly 12, a rotor assembly 13 and a housing assembly 11; the stator assembly 13 is mounted on the housing assembly 11; the motor body 1 has a Hall sensor mounted thereon for detecting position of the rotor or adopts a method of detecting a phase current; the rotor assembly 13 is fitted at inside or outside the stator assembly 12; the motor controller 2 comprises a control box 22 and a control circuit board 21 mounted in the control box 22; the control circuit board 21 generally comprises a power supply circuit, a microprocessor, a bus-current detecting circuit and an frequency inverter; the power supply circuit provides power to each part of the circuits; the microprocessor controls the frequency inverter; the frequency inverter controls turn-on and off of the coil windings of the respective phases of the stator assembly 12.

Figure 5:
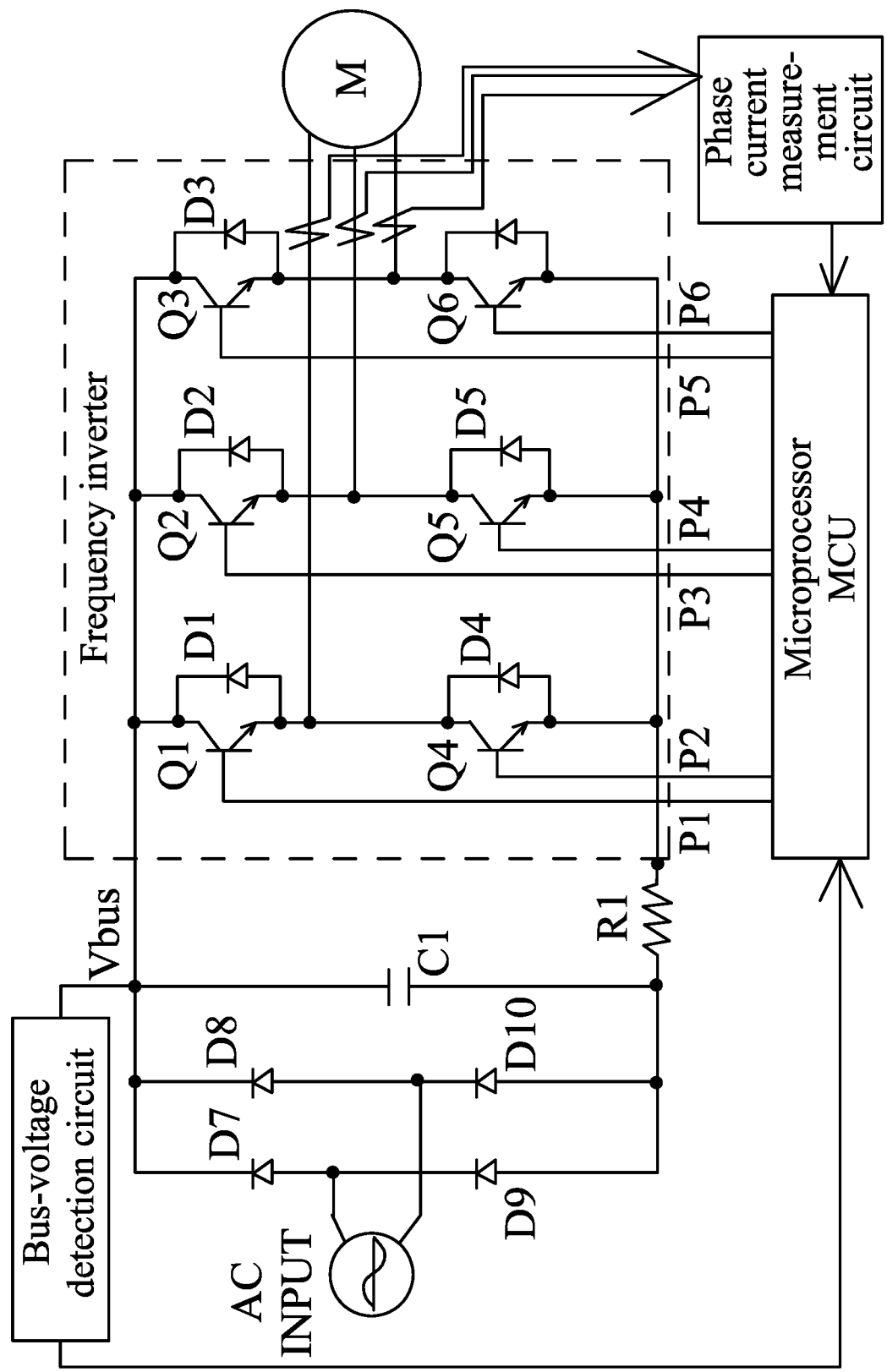
FIG. 5 is a circuit block diagram of the motor controller of the PMSM motor according to the first embodiment of the disclosure.

The frequency inverter in FIG. 5 may be an integrated power module (IPM) or a set of insulated gate bipolar transistors (IGBT); performances of frequency inverters from different manufacturers have a certain difference which is mainly reflected in the difference of deadzone error.

The disclosure provides a method for correcting a compensation item of a PMSM motor; in the method, an error data caused by a deadzone error of the frequency inverter in the control process is measured through an offline measuring method, and a lookup table involving both a current command and a compensation item based on the above-mentioned deadzone error of the frequency inverter is obtained and stored in a memory of the motor controller; then the motor is started and enabled to operate normally, and during the online running state of the motor, the compensation item is again corrected by using the above-mentioned lookup table of the compensation item, to adapt to the current working condition of the motor, thereby achieving the precise control.

Figure 12:
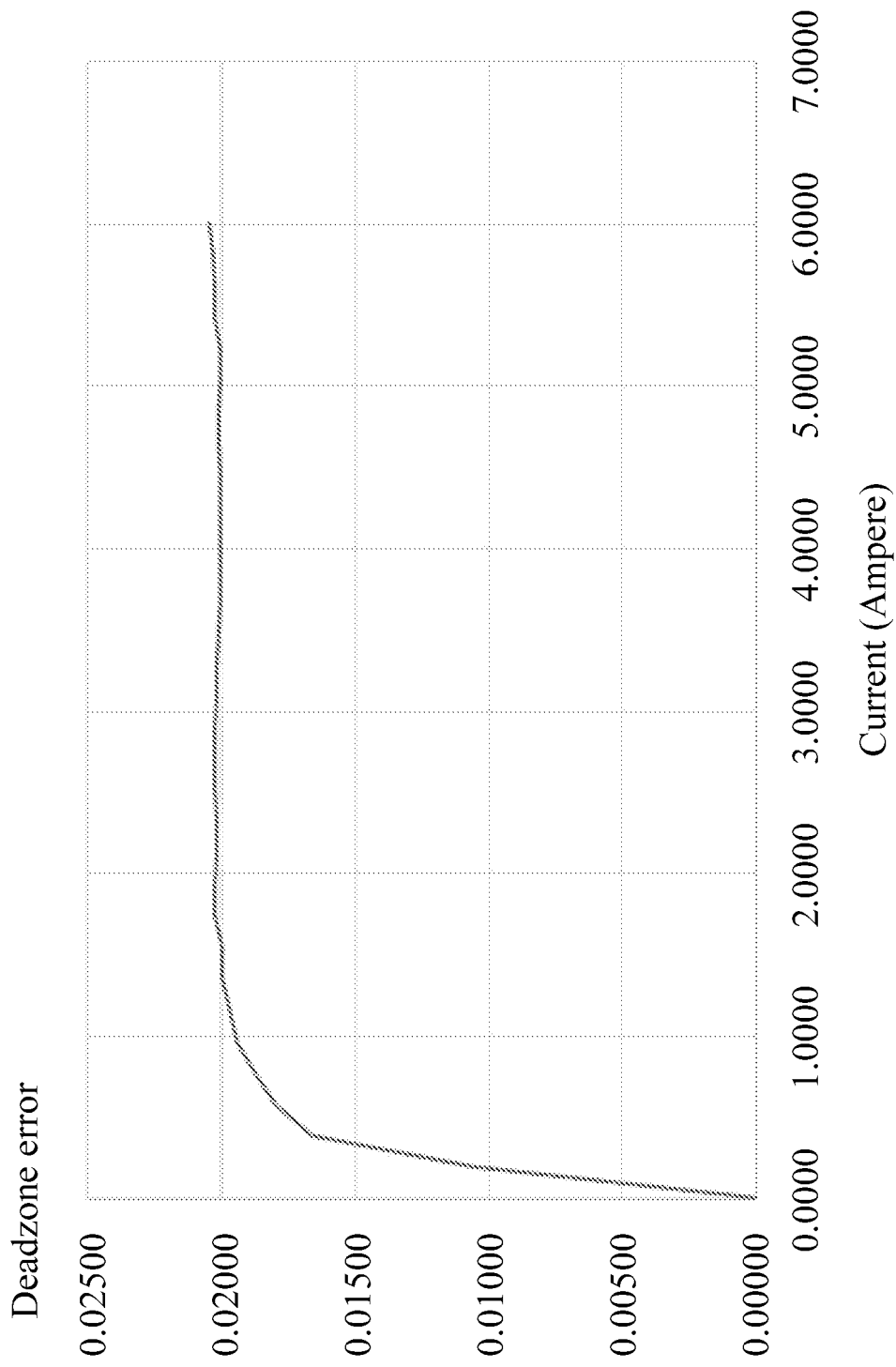
FIG. 12 is a graph showing experimental data corresponding to the look-up table involving both current command and deadzone compensation according to the first embodiment of the disclosure.

The lookup table involving both a current command and a deadzone compensation is obtained by the following steps: step A: controlling the frequency inverter to power on one phase of coil windings of the motor, and power off the remaining phases of coil windings, stepwise increasing the current of the one phase of coil windings from 0 to a rated current; step B: recording and measuring a command voltage and a current generated by the command voltage when stepwise increasing the current, comparing the command voltage with a product of a stator resistance and the current generated by the command voltage, thus obtaining a voltage error, dividing the voltage error by a DC bus voltage, to obtain a deadzone compensation value corresponding to the current generated by the command voltage, and combining currents generated by different command voltages with corresponding deadzone compensation values, to form the lookup table involving the deadzone compensation values, as shown in Table 1; Table 1 is data of a test of Class-A frequency inverters, and the relationship between the two is visually reflected in FIG. 12.

TABLE 1

| Current (A) | Deadzone error (pu) |
|---|---|
| 0.00000 | 0.00000 |
| 0.19355 | 0.02536 |
| 0.38710 | 0.02738 |
| 0.58065 | 0.02816 |
| 0.77419 | 0.02855 |
| 0.96774 | 0.02884 |
| 1.16129 | 0.02916 |
| 1.35484 | 0.02922 |
| 1.54839 | 0.02945 |
| 1.74194 | 0.02964 |
| 1.93548 | 0.02972 |
| 2.12903 | 0.02992 |
| 2.32258 | 0.03005 |
| 2.51613 | 0.03014 |
| 2.70968 | 0.03029 |
| 2.90323 | 0.03045 |
| 3.09678 | 0.03061 |
| 3.29032 | 0.03074 |
| 3.48387 | 0.03089 |
| 3.67742 | 0.03105 |
| 3.87097 | 0.03117 |
| 4.06452 | 0.03130 |
| 4.25807 | 0.03144 |
| 4.45161 | 0.03164 |
| 4.64516 | 0.03183 |
| 4.83871 | 0.03195 |
| 5.03226 | 0.03218 |
| 5.22581 | 0.03243 |
| 5.41935 | 0.03257 |
| 5.61290 | 0.03284 |
| 5.80645 | 0.03306 |
| 6.00000 | 0.03335 |

Figure 6:
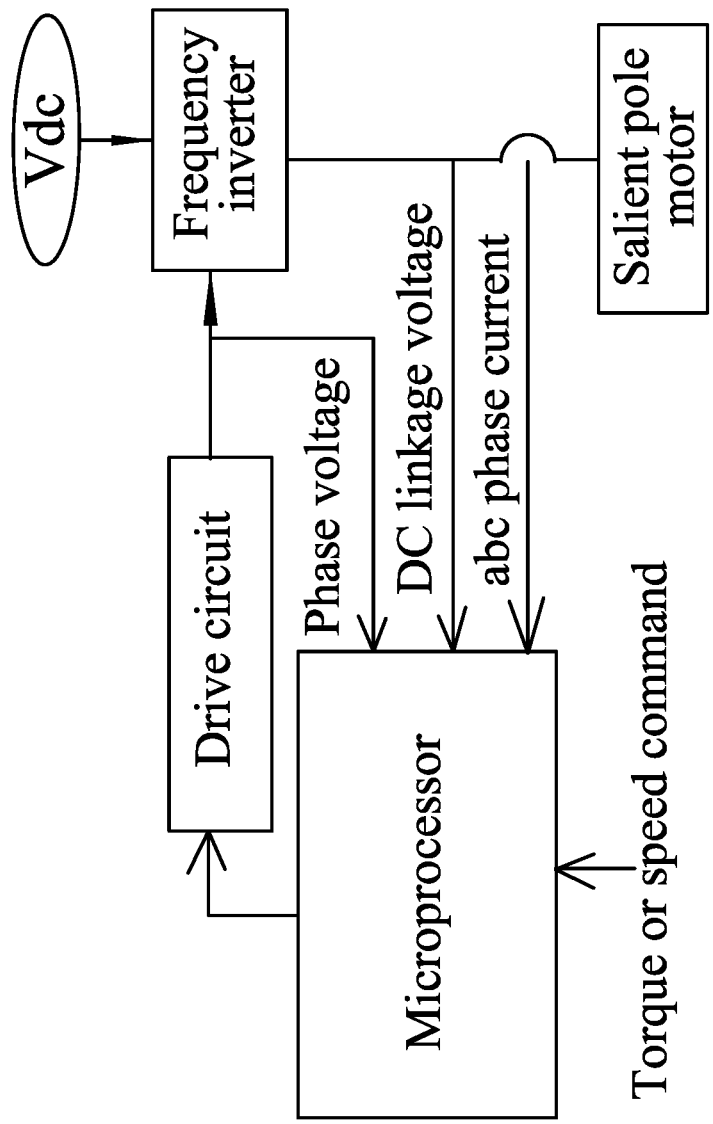
FIG. 6 is a schematic block diagram showing the control of the PMSM motor according to the first embodiment of the disclosure.
Figure 7:
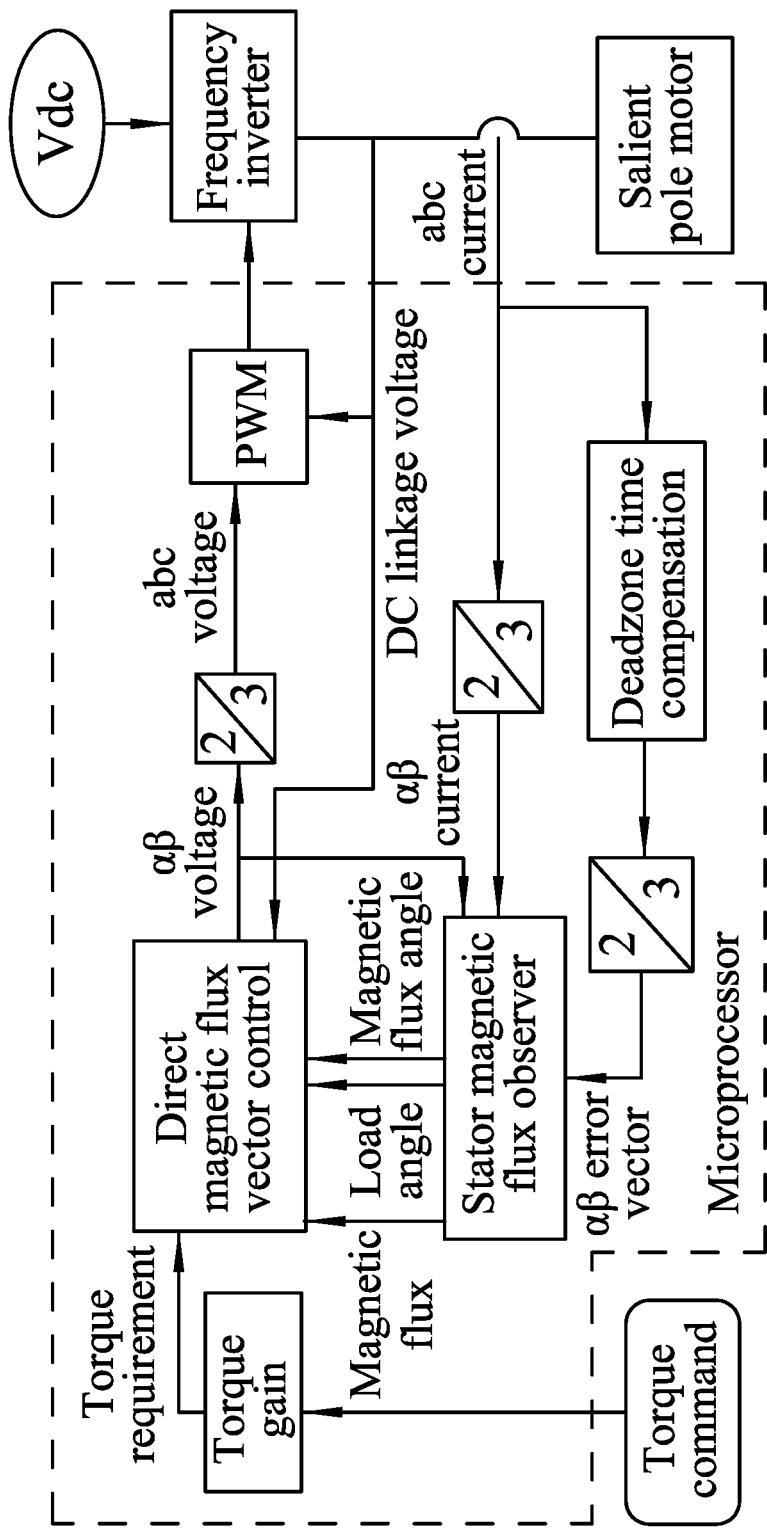
FIG. 7 is a block diagram showing direct stator magnetic flux vector control of a torque input of the PMSM motor according to the first embodiment of the disclosure.

As shown in FIG. 6 and FIG. 7, assuming that the motor controller adopts vector control, and the vector-control technical scheme is prior art.

Figure 9:
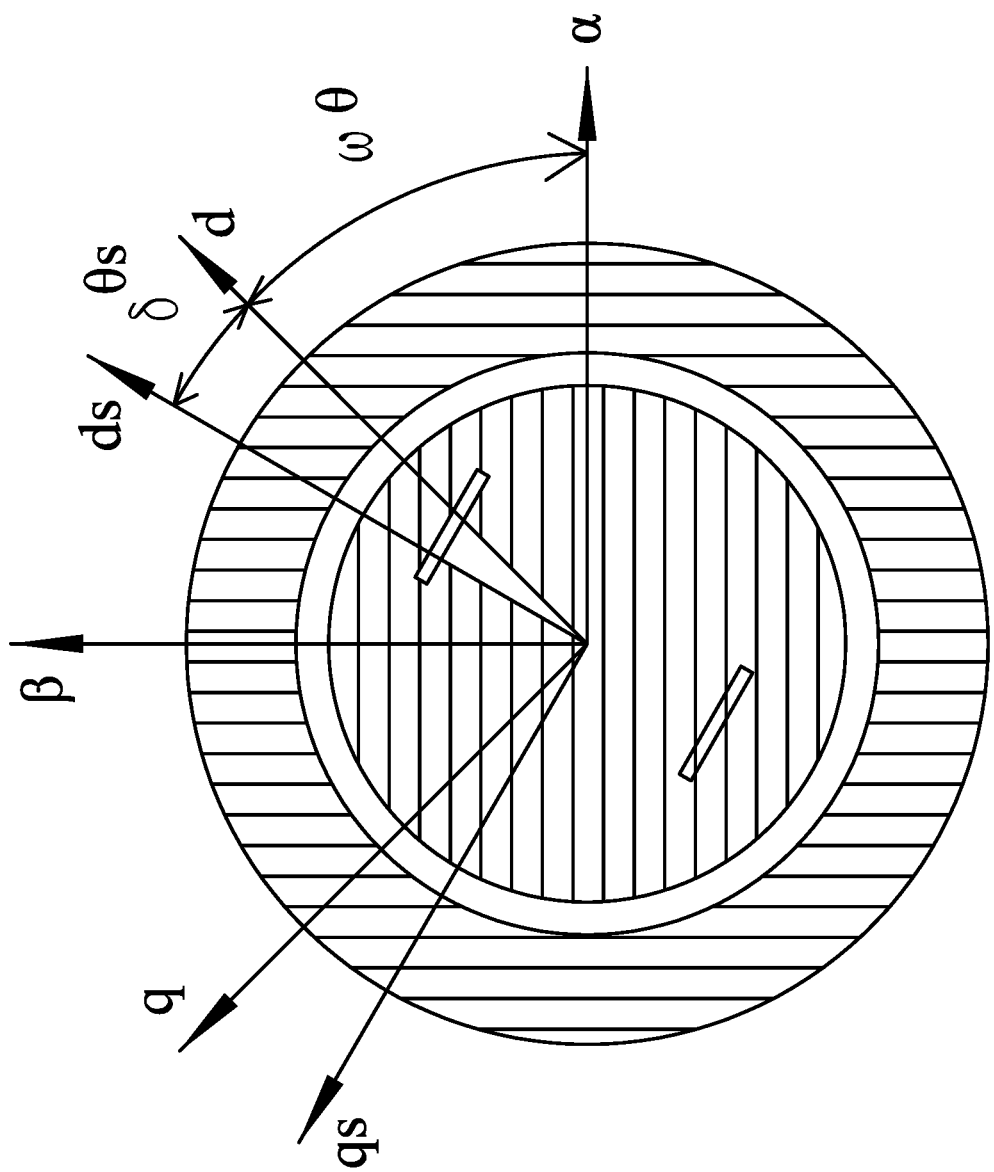
FIG. 9 is a coordinate system diagram of direct stator magnetic flux vector control of the PMSM motor according to the first embodiment of the disclosure.

As shown in FIG. 9, FIG. 9 defines reference coordinates of vectors of the permanent magnet synchronous motor (PMSM), a static coordinate system α-β, a rotating coordinate system d-q of the rotor, and a rotating coordinate system ds-qs of the magnetic flux of the stator, where, ω is the speed of the rotor, δ is a load angle (i.e., the angle between the rotating coordinate system of the magnetic flux of the stator and the rotating coordinate system of the rotor), $\vartheta$ is the angle between the static coordinate system α-β and the rotating coordinate system d-q of the rotor, λ is the magnetic flux vector of the stator, $\vartheta$s is the angle between the static coordinate system α-β and the rotating coordinate system ds-qs of the magnetic flux of the stator.

In the online running state of the motor, online correcting the error data of the parameter by using the lookup table is completed through an electromagnetic calculation equation:

λ=f (U, I, R, L, Edt, Vdt, λm), where, λ is the magnetic flux of the motor;

The function f (U, I, R, L, Edt, Vdt, λm) contains multiple variables, U is a voltage variable, which can be online measured; I is a current variable, which can be online measured; R is the stator resistance, which is offline measured; L is stator inductance, which is offline measured; Edt is an online correction compensation value; Vdt is a variable for the deadzone error of the frequency inverter; λm is the magnetic flux linkage of the motor, which is offline measured.

Figure 8:
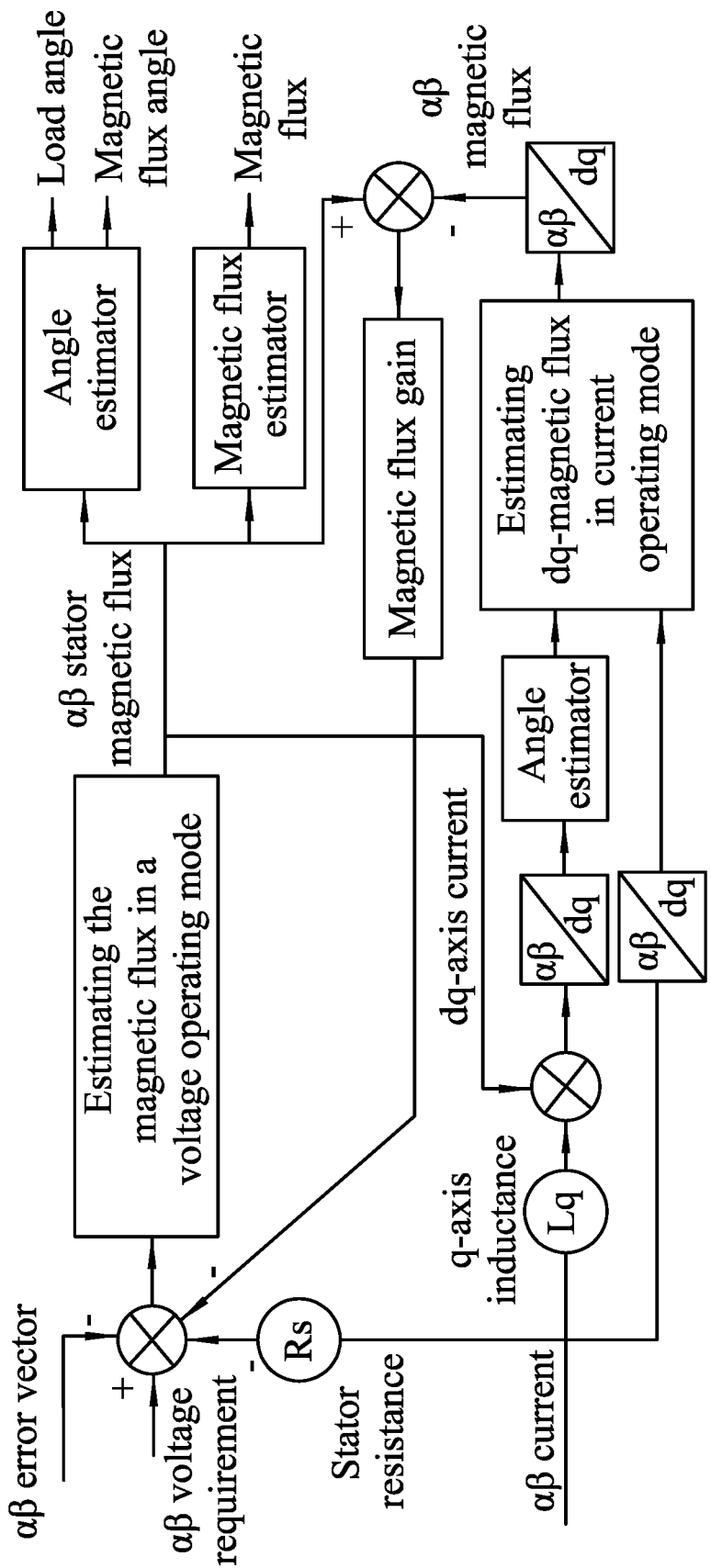
FIG. 8 is a developed view of the stator magnetic flux observer of FIG. 7.

The control mode of the motor will adopt coupling current through magnetic flux, and thus converting into electromagnetic flux control; for magnetic flux of an interior permanent magnet synchronous motor (IPMSM), a mathematical expression is usually expressed in rotor coordinates d, q, as shown in FIG. 8.

$$\bar{\lambda}_{dq} = [L] \cdot \begin{bmatrix} i_d \\ i_q \end{bmatrix} + \begin{bmatrix} \lambda_m \\ 0 \end{bmatrix} = \begin{bmatrix} \lambda_d(i_d, i_q) \\ \lambda_q(i_d, i_q) \end{bmatrix} \quad (1)$$

where, λm is the magnetic flux linkage.

If the magnetic flux is not saturated, the above formula can be simplified as follows:

$$\bar{\lambda}_{dq} = \begin{bmatrix} L_d & 0 \\ 0 & L_q \end{bmatrix} \cdot \begin{bmatrix} i_d \\ i_q \end{bmatrix} + \begin{bmatrix} \lambda_m \\ 0 \end{bmatrix} \quad (2)$$

where, Ld is the d-axis inductance of the motor, Lq is the q-axis inductance of the motor.

In a start-up phase, for calculation of the magnetic flux, the calculation can be simplified, and for the sake of simplicity, we use $\vartheta=0°$.

This will adjust the rotor to $\vartheta=0°$, so that the d-axis is associated with the α-axis and the q-axis is associated with the β-axis. If a constant voltage command is used, then the change in current does not induce magnetic flux, i.e.:

$$L_d \frac{di_d}{dt} = L_q \frac{di_q}{dt} = 0 \quad (3)$$

The magnetic module of the rotor is simplified as follows:

$$\begin{bmatrix} \lambda_d \\ \lambda_q \end{bmatrix} = \begin{bmatrix} \lambda_m \\ 0 \end{bmatrix} \quad (4)$$

Figure 10:
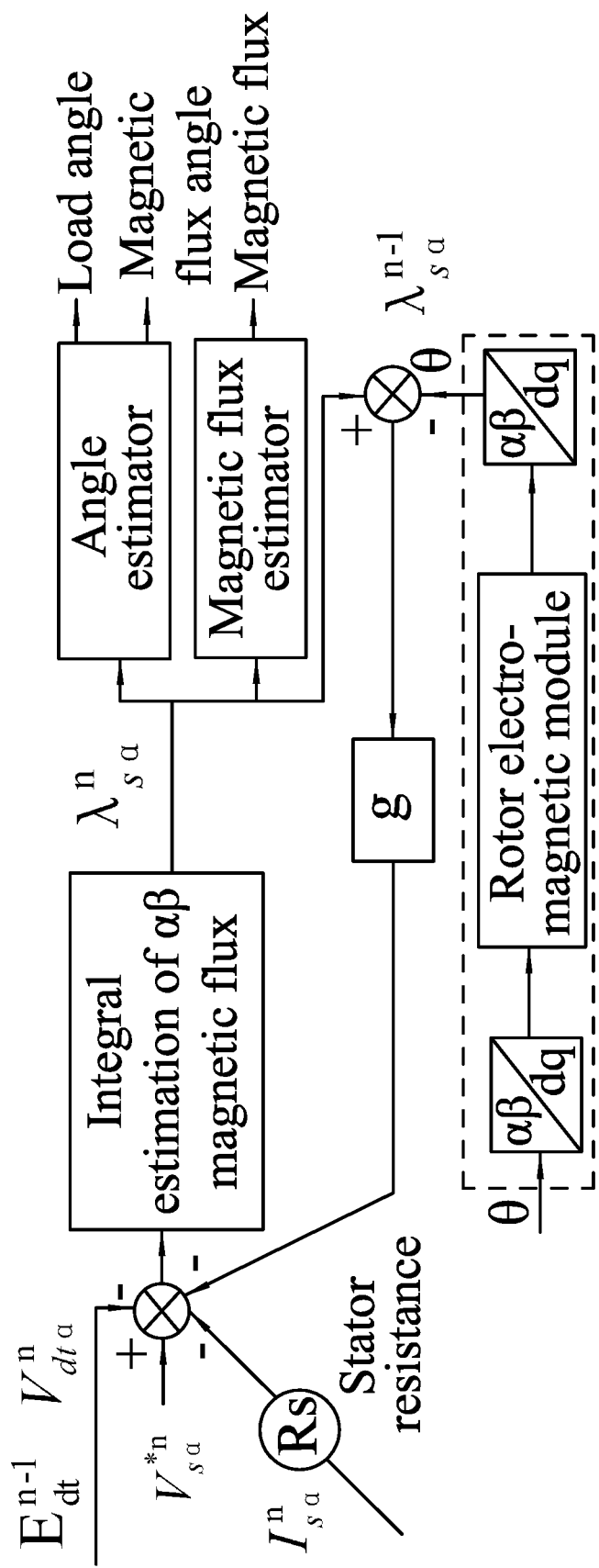
FIG. 10 is a model diagram of a simplified magnetic flux observer of the PMSM motor according to the first embodiment of the disclosure.

The stator magnetic flux observer is simplified as shown in FIG. 10. As an equation, the simplified stator magnetic flux observer in FIG. 10 adopts θ=0°, and the equation for calculating the magnetic flux obtained with the constant command voltage is:

$$\lambda_{s\alpha}^n = \Sigma V_{s\alpha}^{*n} + g(\lambda_m - \lambda_{s\alpha}^{n-1}) - R_s I_{s\alpha}^n - E_{dt}^{n-1} V_{dt\alpha}^n \quad (5)$$

where, $\lambda_{s\alpha}^n$ is the α-axis magnetic flux vector at the $n^{th}$ step; λm is the magnetic flux linkage of the motor;

$V_{s\alpha}^{*n}$ is the α-axis voltage vector at the $n^{th}$ step; g=Rs/Ld, Rs is the stator resistance, and Ld is the d-axis inductance;

$\lambda_{s\alpha}^{n-1}$ is the α-axis magnetic flux vector at the n−1$^{th}$ step; $I_{s\alpha}^n$ is the α-axis current vector at the $n^{th}$ step;

$E_{dt}^{n-1}$ is the compensation value at the n−1$^{th}$ step; $V_{dt\alpha}^n$ is the variable for the α-axis deadzone error at the $n^{th}$ step;

n is the number of adjustment of $E_{dt}^{n-1}$.

Figure 11:
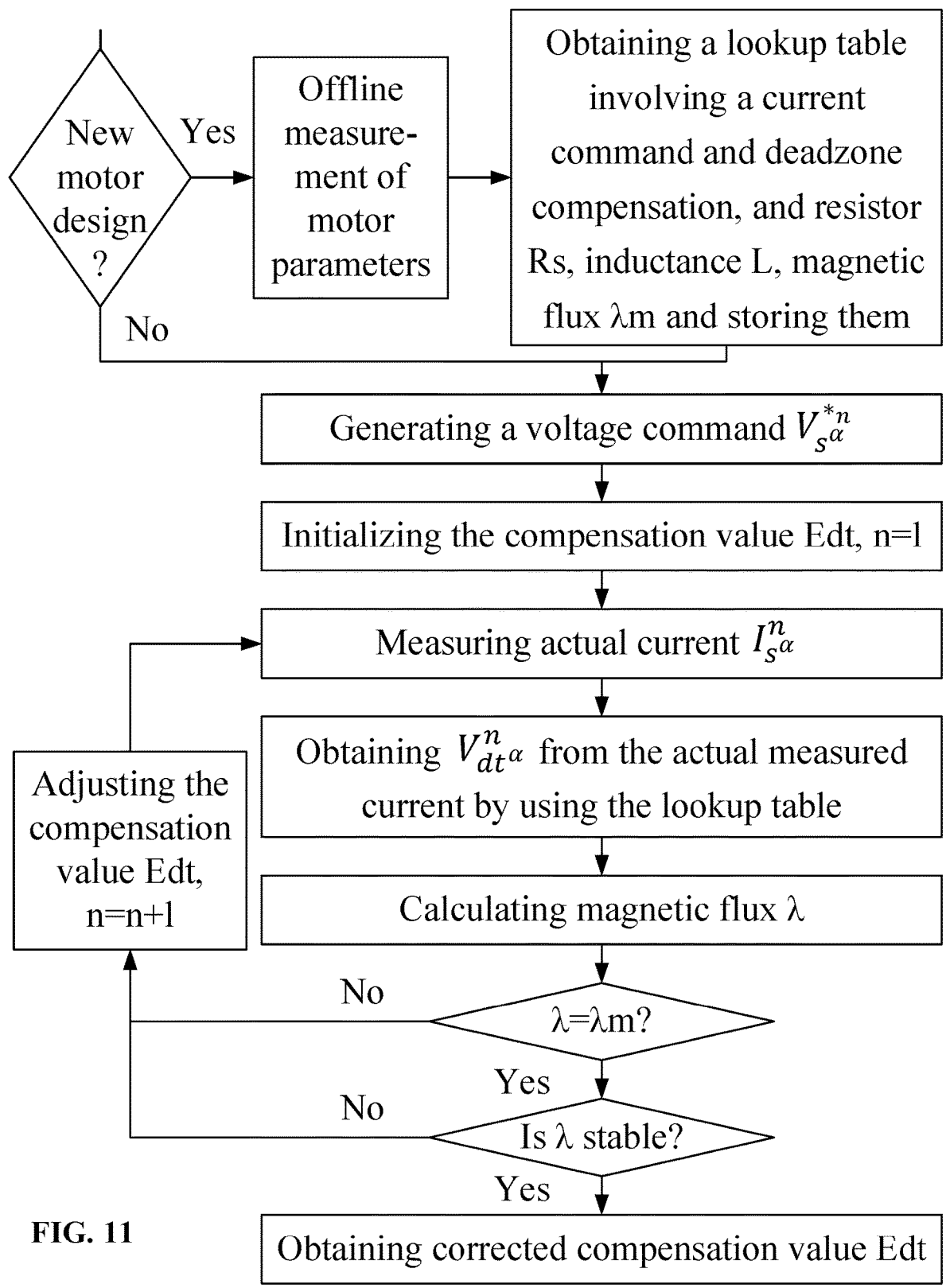
FIG. 11 is a block diagram showing a basic workflow of the disclosure.

As shown in FIG. 11, the workflow of the disclosure is as follows: for designing a new motor, it is necessary to measure the motor parameters through an offline method, thus obtaining a lookup table (see Table 1) involving both current command and deadzone compensation, as well as the resistance Rs, the inductance L, and the magnetic flux linkage λm and storing them in the motor controller; if it is not for designing a new motor, then the measured parameters that are originally stored are used, without changing programs. When the motor starts running, a program module of the microprocessor for determining the compensation item is activated to work, and the working steps of this program module for determining the compensation item are as follows:

step 1: generating a command voltage $V_{s\alpha}^{*n}$;

step 2: initializing the compensation value Edt (assuming it is equal to 0.75), n=1 (n is a counting number);

step 3: measuring the current $I_{s\alpha}^n$ in actual running, and according to the measured current $I_{s\alpha}^n$[ ] in actual running, using the lookup table (see Table 1) to obtain the deadzone error $V_{dt\alpha}^n$;

step 4: according to the above formula (5) for calculation of the magnetic flux, calculating the magnetic flux λ;

step 5: comparing whether the magnetic flux λ, is equal to λm, and if not, adjusting the compensation value Edt (assuming an increment of 0.1 at each time), and taking n=n+1, then returning to step 3; if the magnetic flux λ is equal to λm, then taking the current compensation value Edt as the final online correction compensation value.

The above function for calculating the magnetic flux is not the only one; when the stator magnetic flux observer adopts that θ is not equal to 0°, then another magnetic flux calculation equation will be obtained, and the model may be slightly complicated, but it also can be realized.

The following explains, by way of illustration, some examples of the application of the disclosure in actual production:

Application Example 1

The motor 1 is designed to be a motor with ½ horsepower (hp), and the measured motor parameters are as follows: the stator resistance is 3.175Ω, the d-axis inductance is 45 mH, the q-axis inductance is 66 mH, λm=0.1499 Vs. A frequency inverter A, with required deadzone time of 650 ns (nanoseconds), is adopted. For use with the same motor product (the motor 1) and the frequency inverter A, the deadzone-compensation lookup table is measured and calculated, and the limit of the calculated deadzone compensation is 1500 ns. The frequency inverter A acts on the stator coil windings under a command DC voltage of the motor, and the current of the stator coil windings is measured, then the actually measured voltage and the command DC voltage are compared and calculated to obtain the deadzone compensation value (deadzone error), and then according to the procedure steps of FIG. 11, for use with the motor 1 and the same frequency inverter A, the calculated Edt is obtained to be 1.09. As taking cost-saving measures, a frequency inverter B is adopted, which has required deadzone time of 1071 ns. For use with the motor 1 and the new frequency inverter B, through the procedure steps of FIG. 11, the calculated Edt is obtained to be 0.81.

Application Example 2

The motor 2 is designed to be a motor with ½ hp, and the measured motor parameters are as follows: the stator resistance is 3.175Ω, the d-axis inductance is 45 mH, the q-axis inductance is 66 mH, λm=0.1499 Vs. A frequency inverter A, with required deadzone time of 650 ns (nanoseconds), is adopted. For use with the same motor product (the motor 2) and the frequency inverter A, the deadzone-compensation lookup table is measured and calculated, and the limit of the calculated deadzone compensation is 1500 ns. The frequency inverter A acts on the stator coil windings under a command DC voltage of the motor, and the current of the stator coil windings is measured, then the actually measured voltage and the command DC voltage are compared and calculated to obtain the deadzone compensation value (deadzone error), and then according to the procedure steps of FIG. 11, for use with the motor 2 and the same frequency inverter A, the calculated Edt is obtained to be 1.09. For use with a motor 3 coming from the same production line and the same frequency inverter A, through the same method described above, the calculated Edt is obtained to be 1.07.

Application Example 3

The motor 4 is designed to be a motor with 1 hp, and the measured motor parameters are as follows: the stator resistance is 1.65Ω, the d-axis inductance is 26 mH, the q-axis inductance is 42 mH, λm=0.1582 Vs. A frequency inverter A, with required deadzone time of 650 ns (nanoseconds), is adopted. For use with the same motor product (the motor 4) and the frequency inverter A, the deadzone-compensation lookup table is measured and calculated, and the limit of the calculated deadzone compensation is 1500 ns. The frequency inverter A acts on the stator coil windings under a command DC voltage of the motor, and the current of the stator coil windings is measured, then the actually measured voltage and the command DC voltage are compared and calculated to obtain the deadzone compensation value (deadzone error), and then according to the procedure steps of FIG. 11, for use with the motor 4 and the same frequency inverter A, the calculated Edt is obtained to be 1.05. Thereafter, the motor 4 is used under normal conditions for several years. For use with the motor 4 and the same frequency inverter A, through the same method described above, the calculated Edt is obtained to be 1.10.

Experimental test results of the disclosure are as follows: experiments are conducted respectively on each of four same-type (same-production-line) motors with ⅓ hp, namely, MOTOR1, MOTOR2, MOTOR3 and MOTOR4; in the four motors, two types of frequency inverters A, B are adopted respectively to test data, and the final data are shown in Table 2; the frequency inverter A is represented by "Frequency Inverter A", and the frequency inverter B is represented by "Frequency Inverter B". The middle column 180, 230, 270 represents the bus voltage of the frequency inverter.

TABLE 2

⅓ hp

| Frequency Inverter A | | | | | Frequency Inverter B | | | |
|---|---|---|---|---|---|---|---|---|
| Motor 1 | Motor 2 | Motor 3 | Motor 4 | | Motor 1 | Motor 2 | Motor 3 | Motor 4 |
| 1.07 | 1.09 | 1.16 | 1.13 | 180 | 0.75 | 0.79 | 0.85 | 0.82 |
| 1.07 | 1.08 | 1.14 | 1.1 | 230 | 0.77 | 0.8 | 0.85 | 0.82 |
| 1.06 | 1.06 | 1.11 | 1.09 | 270 | 0.77 | 0.8 | 0.85 | 0.83 |

Experiments are conducted respectively on each of three same-type (same-production-line) motors with ½ hp, namely, MOTOR1, MOTOR2 and MOTOR3; in the three motors, two types of frequency inverters (Frequency Inverter A and Frequency Inverter B) are adopted respectively to test data, and the final data are shown in Table 3; the frequency inverter A is represented by "Frequency Inverter A", and the frequency inverter B is represented by "Frequency Inverter B". The middle column 180, 230, 270 represents the bus voltage of the frequency inverter.

TABLE 3

½ hp

| Frequency Inverter A | | | | Frequency Inverter B | | |
|---|---|---|---|---|---|---|
| Motor 1 | Motor 2 | Motor 3 | | Motor 1 | Motor 2 | Motor 3 |
| 1.1 | 1.08 | 1.07 | 180 | 0.8 | 0.78 | 0.76 |
| 1.09 | 1.08 | 1.07 | 230 | 0.81 | 0.79 | 0.78 |
| 1.09 | 1.07 | 1.06 | 270 | 0.82 | 0.8 | 0.79 |

Experiments are conducted respectively on each of three same-type (same-production-line) motors with ¾ hp, namely, MOTOR1, MOTOR2 and MOTOR3; in the three motors, two types of frequency inverters (Frequency inverter A and Frequency Inverter B) are adopted respectively to test data, and the final data are shown in Table 4; the frequency inverter A is represented by "Frequency Inverter A", and the frequency inverter B is represented by "Frequency Inverter B". The middle column 180, 230, 270 represents the bus voltage of the frequency inverter.

TABLE 4

¾ hp

| Frequency Inverter A | | | | Frequency Inverter B | | |
|---|---|---|---|---|---|---|
| Motor 1 | Motor 2 | Motor 3 | | Motor 1 | Motor 2 | Motor 3 |
| 1.03 | 1.06 | 1.09 | 180 | 0.7 | 0.75 | 0.8 |
| 1.04 | 1.07 | 1.08 | 230 | 0.74 | 0.79 | 0.82 |
| 1.04 | 1.07 | 1.08 | 270 | 0.77 | 0.8 | 0.82 |

Experiments are conducted respectively on each of three same-type (same-production-line) motors with 1 hp, namely, MOTOR1, MOTOR2 and MOTOR3; in the three motors, two types of frequency inverters (Frequency Inverter A and Frequency Inverter B) are adopted respectively to test data, and the final data are shown in Table 5; the frequency inverter A is represented by "Frequency Inverter A", and the frequency inverter B is represented by "Frequency Inverter B". The middle column 180, 230, 270 represents the bus voltage of the frequency inverter.

TABLE 5

1 hp

| Frequency Inverter A | | | | Frequency Inverter B | | |
|---|---|---|---|---|---|---|
| Motor 1 | Motor 2 | Motor 3 | | Motor 1 | Motor 2 | Motor 3 |
| 1.04 | 1.09 | 1.09 | 180 | 0.74 | 0.81 | 0.81 |
| 1.05 | 1.09 | 1.1 | 230 | 0.78 | 0.83 | 0.83 |
| 1.06 | 1.09 | 1.09 | 270 | 0.8 | 0.84 | 0.84 |

It can be analyzed from the above experimental data that, with the method of the disclosure, the aforementioned technical problem in the prior art is solved, that is, an error of the motor parameter in operation processes can be compensated, thereby improving control precision of the motor, offering strong adaptability, loosening up tolerance requirements on production, and thereby reducing production cost.

When same-type motors adopt lower-cost frequency inverters to reduce cost, the motor control program needs not to be changed, and also appropriate compensation can be obtained to improve the control precision of the motor.

In addition, the method of the disclosure does not require to increase hardware costs, as the look-up table involving both the motor current command and the deadzone compensation is measured offline, and the offline measurement can reduce computation time of a microprocessor (single-chip microcomputer or MCU) in the motor controller; during an online running state, the compensation item is again corrected by using the above-mentioned lookup table of involving both the current command and the deadzone compensation, and at the same time, the changes of the motor parameters in the operation processes are compensated by the corrected compensation item.

Example 2

The disclosure provides a method for correcting a compensation item of a PMSM motor, the method is characterized in that: an error data of a parameter of the motor in the control process is measured through an offline measuring method, and a lookup table involving both a current command and a compensation item based on the above-mentioned certain parameter is obtained and stored in a memory of the motor controller; then the motor is started and enabled to operate normally, and during the online running state of the motor, the compensation item is again corrected by using the lookup table of the compensation item of the above-mentioned certain parameter, to adapt to the current working condition of the motor, thereby achieving the purpose of precise control.

The motor parameter measured offline is the stator resistance, and the obtained lookup table is a lookup table involving the stator resistance and the ambient temperature in correspondence.

Then, an equation $\lambda = f(U, I, R, L, Edt, Vdt, \lambda m)$ is established according to the electromagnetic theory, where, $\lambda$ is the magnetic flux of the motor;

The function $f(U, I, R, L, Edt, Vdt, \lambda m)$ contains multiple variables, U is a voltage variable, which can be online measured; I is a current variable, which can be online measured; R is the stator resistance, and one can detect the ambient temperature to find the corresponding stator resistance value, and it is recommended to look up the table; L is the stator inductance, which is offline measured; Edt is an online correction compensation value; Vdt is the value of the deadzone error of the frequency inverter, which can be offline measured; $\lambda m$ is the magnetic flux linkage of the motor, which is offline measured. By utilizing the method for calculating the compensation value in the first embodiment, the corresponding compensation can be obtained.

The function $f(U, I, R, L, Edt, Vdt, \lambda m)$ forms a variable set, and the compensation value is an overall correction to the variable set; the ambient temperature is detected offline to find the corresponding stator resistance value; the lookup table is established for saving the computation time of the microprocessor.

It will be obvious to those skilled in the art that changes and modifications may be made, and therefore, the aim in the appended claims is to cover all such changes and modifications.

What is claimed is:

1. A method for correcting a compensation item of a PMSM motor, the method comprising:
   offline measuring an error data of a parameter of the motor in a control process;
   providing a series of current commands and calculating compensation values of the parameter corresponding to the series of current commands, and establishing a lookup table with regard to the series of current commands and the compensation values of the parameter corresponding to the series of current commands;
   storing the lookup table in a memory of a motor controller;
   starting and allowing the motor to work at a normal state; and
   online correcting the error data of the parameter by using the lookup table;
   wherein:
   the parameter of the motor refers to a deadzone error of a frequency inverter, and the lookup table refers to a relationship between the series of current commands and the compensation values; and
   establishing the lookup table with regard to the series of current commands and the compensation values of the parameter corresponding to the series of current commands comprises:
   1) controlling the frequency inverter to power on one phase of coil windings of the motor, and power off the remaining phases of coil windings, stepwise increasing a current of the one phase of coil windings from 0 to a rated current; and
   2) recording and measuring a command voltage and a current generated by the command voltage when stepwise increasing the current, comparing the command voltage with a product of a stator resistance and the current generated by the command voltage, to acquire a voltage error, dividing the voltage error by a DC bus voltage, to obtain a deadzone compensation value corresponding to the current generated by the command voltage, and combining currents generated by different command voltages with corresponding deadzone compensation values, to form the lookup table involving the deadzone compensation values.

2. The method of claim 1, wherein online correcting the error data of the parameter by using the lookup table is completed through an electromagnetic calculation equation:
   $\lambda = f(U, I, R, L, Edt, Vdt, \lambda m)$, where $\lambda$ is a magnetic flux of the motor;
   $f(U, I, R, L, Edt, Vdt, \lambda m)$ contains multiple variables, U is a voltage variable; I is a current variable; R is the stator resistance; L is a stator inductance; Edt is an online correction compensation value; Vdt is a variable for the deadzone error of the frequency inverter; $\lambda m$ is a magnetic flux linkage of the motor.

3. The method of claim 2, wherein the electromagnetic calculation equation: $\lambda = f(U, I, R, L, Edt, Vdt, \lambda m)$ is established under sensorless vector control, and is represented by:

$$\lambda_{s\alpha}^{n} = \Sigma V_{s\alpha}^{*n} + g(\lambda_m - \lambda_{s\alpha}^{n-1}) - R_s I_{s\alpha}^{n} - E_{dt}^{n-1} V_{dt\alpha}^{n},$$

$\lambda_{s\alpha}^{n}$ is an α-axis magnetic flux vector at an $n^{th}$ step; $\lambda m$ is the magnetic flux linkage of the motor;

$V_{s\alpha}^{*n}$ is an α-axis voltage vector at $n^{th}$ step; g=Rs/Ld, Rs is the stator resistance, and Ld is a d-axis inductance;

$\lambda_{s\alpha}^{n-1}$ is an α-axis magnetic flux vector at an $n-1^{th}$ step;

$I_{s\alpha}^{n}$ is an α-axis current vector at the $n^{th}$ step;

$E_{dt}^{n-1}$ is an online correction compensation value at the $n-1^{th}$ step;

$V_{dt\alpha}^{n}$ is an α-axis variable for the deadzone error at the $n^{th}$ step; and n is a number of adjustment of $E_{dt}^{n-1}$.

4. A method for correcting a compensation item of a PMSM motor, the method comprising:

storing a stator resistance, a stator inductance, a magnetic flux linkage, and a deadzone-compensation lookup table that are offline determined in a memory of a motor controller, wherein, the deadzone-compensation lookup table is a comparison table formed by combining currents generated by different command voltages and corresponding deadzone compensation values;

allowing the motor to run, ordering, by the motor controller, a command voltage, then detecting a current generated by the command voltage, and finding out a corresponding deadzone compensation value according to the current generated by the command voltage in the deadzone-compensation lookup table, establishing an equation for calculating a magnetic flux: λ=f (U, I, R, L, Edt, Vdt, λm) using an electromagnetic theory for a motor, wherein, λ is the magnetic flux; f (U, I, R, L, Edt, Vdt, λm) contains multiple variables, U is a voltage variable; I is a current variable; R is the stator resistance; L is the stator inductance; Edt is an online correction compensation value; Vdt is a variable for a deadzone error of a frequency inverter; λm is the magnetic flux linkage; using the equation λ=f (U, I, R, L, Edt, Vdt, λm) to perform online correction on the compensation value Edt.

5. The method of claim 4, wherein the deadzone-compensation lookup table with regard to the deadzone compensation values is established by the following steps: controlling the frequency inverter to power on one phase of coil windings of the motor, and power off the remaining phases of coil windings, stepwise increasing a current of the one phase of coil windings from 0 to a rated current; recording and measuring a command voltage and a current generated by the command voltage when stepwise increasing the current, comparing the command voltage with a product of the stator resistance and the current generated by the command voltage, thus obtaining a voltage error, dividing the voltage error by a DC bus voltage, to obtain a deadzone compensation value corresponding to the current generated by the command voltage, and combining currents generated by different command voltages with corresponding deadzone compensation values, to form the deadzone-compensation lookup table involving the deadzone compensation values.

6. The method of claim 4, wherein the equation λ=f (U, I, R, L, Edt, Vdt, λm) is obtained based on an electromagnetic theoretical model of a BLDC motor under vector control in the absence of a position sensor.

7. The method of claim 5, wherein the equation λ=f (U, I, R, L, Edt, Vdt, λm) is obtained based on an electromagnetic theoretical model of a BLDC motor under vector control in the absence of a position sensor.

8. The method of claim 6, wherein the equation: λ=f (U, I, R, L, Edt, Vdt, λm) is established under sensorless vector control, and is represented by:

$$\lambda_{s\alpha}^{n}=\Sigma V_{s\alpha}^{*n}+g(\lambda_{m}-\lambda_{s\alpha}^{n-1})-R_{s}I_{s\alpha}^{n}-E_{dt}^{n-1}V_{dt\alpha}^{n},$$

$\lambda_{s\alpha}^{n}$ is an α-axis magnetic flux vector at an $n^{th}$ step; λm is the magnetic flux linkage;

$V_{s\alpha}^{*n}$ is an α-axis voltage vector at $n^{th}$ step; g=Rs/Ld, Rs is the stator resistance, and Ld is a d-axis inductance;

$\lambda_{s\alpha}^{n-1}$ is an α-axis magnetic flux vector at an $n-1^{th}$ step;

$I_{s\alpha}^{n}$ is an α-axis current vector at the $n^{th}$ step;

$E_{dt}^{n-1}$ is an online correction compensation value at the $n-1^{th}$ step;

$V_{dt\alpha}^{n}$ is an α-axis variable for the deadzone error at the $n^{th}$ step; and n is a number of adjustment of $E_{dt}^{n-1}$.

9. The method of claim 7, wherein the equation: λ=f (U, I, R, L, Edt, Vdt, λm) is established under sensorless vector control, and is represented by:

$$\lambda_{s\alpha}^{n}=\Sigma V_{s\alpha}^{*n}+g(\lambda_{m}-\lambda_{s\alpha}^{n-1})-R_{s}I_{s\alpha}^{n}-E_{dt}^{n-1}V_{dt\alpha}^{n},$$

$\lambda_{s\alpha}^{n}$ is an α-axis magnetic flux vector at an $n^{th}$ step; λm is the magnetic flux linkage;

$V_{s\alpha}^{*n}$ is an α-axis voltage vector at $n^{th}$ step; g=Rs/Ld, Rs is the stator resistance, and Ld is a d-axis inductance;

$\lambda_{s\alpha}^{n-1}$ is an α-axis magnetic flux vector at an $n-1^{th}$ step;

$I_{s\alpha}^{n}$ is an α-axis current vector at the $n^{th}$ step;

$E_{dt}^{n-1}$ is an online correction compensation value at the $n-1^{th}$ step;

$V_{dt\alpha}^{n}$ is an α-axis variable for the deadzone error at the $n^{th}$ step; and n is a number of adjustment of $E_{dt}^{n-1}$.

10. The method of claim 8, wherein the compensation value Edt is corrected as follows: inputting a constant command voltage $V_{s\alpha}^{*n}$, letting a dq coordinate system coincide with an αβ coordinate system, θ=0°, and giving an initial value of the compensation value Edt, thus according to the difference between a calculated magnetic flux $\lambda_{s\alpha}^{n}$ and the magnetic flux linkage λm, continuously narrowing the difference to online correct the compensation value Edt, until the calculated flux $\lambda_{s\alpha}^{n}$ equals to the magnetic flux linkage λm.

11. The method of claim 9, wherein the compensation value Edt is corrected as follows: inputting a constant command voltage $V_{s\alpha}^{*n}$, letting a dq coordinate system coincide with an αβ coordinate system, θ=0°, and giving an initial value of the compensation value Edt, thus according to the difference between a calculated magnetic flux $\lambda_{s\alpha}^{n}$ and the magnetic flux linkage λm, continuously narrowing the difference to online correct the compensation value Edt, until the calculated magnetic flux $\lambda_{s\alpha}^{n}$ equals to the magnetic flux linkage λm.

\* \* \* \* \*